(12) United States Patent
Maeda

(10) Patent No.: US 10,845,581 B2
(45) Date of Patent: Nov. 24, 2020

(54) OPTICAL APPARATUS

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/582,033

(22) Filed: Sep. 25, 2019

(65) Prior Publication Data

US 2020/0103636 A1 Apr. 2, 2020

(30) Foreign Application Priority Data

Sep. 28, 2018 (JP) .................................. 2018-184263

(51) Int. Cl.

| | | |
|---|---|---|
| *G02B 17/00* | (2006.01) | |
| *G03B 21/28* | (2006.01) | |
| *G02B 27/12* | (2006.01) | |
| *G03B 21/00* | (2006.01) | |
| *G02B 27/10* | (2006.01) | |
| *G03B 21/20* | (2006.01) | |

(52) U.S. Cl.
CPC ....... *G02B 17/008* (2013.01); *G02B 27/1033* (2013.01); *G02B 27/126* (2013.01); *G03B 21/005* (2013.01); *G03B 21/008* (2013.01); *G03B 21/28* (2013.01); *G03B 21/208* (2013.01); *G03B 21/2026* (2013.01); *G03B 21/2066* (2013.01)

(58) Field of Classification Search
CPC .. G03B 21/008; G03B 21/006; G03B 21/005; G03B 21/28; G03B 17/008; G02B 27/1026; G02B 27/1033; G02B 27/126

USPC ...................................................... 353/98, 99
See application file for complete search history.

(56) References Cited

U.S. PATENT DOCUMENTS

| | | | | |
|---|---|---|---|---|
| 7,006,609 B2* | 2/2006 | Cloutier | ................ | H04M 1/652 379/88.12 |
| 2004/0169829 A1* | 9/2004 | Kwon | ................ | G02B 27/0031 353/98 |
| 2004/0184012 A1* | 9/2004 | Hori | ......................... | H04N 5/74 353/99 |

(Continued)

FOREIGN PATENT DOCUMENTS

| | | |
|---|---|---|
| JP | 2004138667 A | 5/2004 |
| JP | 2007121693 A | 5/2007 |
| JP | 2014067031 A | 4/2014 |

*Primary Examiner* — William C. Dowling
(74) *Attorney, Agent, or Firm* — Carter, DeLuca & Farrell LLP

(57) ABSTRACT

An optical apparatus includes a light source unit, at least one first light modulation element, an illumination optical system configured to illuminate the first light modulation element using light from the light source unit, and a relay optical system configured to make conjugate with each other a predetermined surface on an optical path between the light source unit and the first light modulation element, and a surface of the first light modulation element. The relay optical system includes, in order from the predetermined surface to the first light modulation element, a first reflection surface having a positive power, a second reflection surface having a negative power, and a third reflection surface having a positive power. The relay optical system satisfies a predetermined condition.

13 Claims, 5 Drawing Sheets

(56) References Cited

U.S. PATENT DOCUMENTS

| | | | |
|---|---|---|---|
| 2005/0046808 A1* | 3/2005 | Shiraishi | G03B 21/28 |
| | | | 353/98 |
| 2015/0316781 A1 | 11/2015 | Maeda | |
| 2019/0310540 A1 | 10/2019 | Maeda | |
| 2019/0331993 A1 | 10/2019 | Maeda | |

* cited by examiner

OPTICAL APPARATUS

BACKGROUND OF THE INVENTION

Field of the Invention

The present invention relates to an optical apparatus, such as an image projection apparatus.

Description of the Related Art

A projector (image projection apparatus) used in a flight simulator for night take-off and landing training is demanded for a contrast higher than conventional so as to more realistically reproduce a night view in which runway edge lights turn on in dark surroundings.

Japanese Patent Application Laid-Open No. ("JP") 2007-121693 discloses a projector using a relay optical system for an illumination optical system in order to realize a higher contrast than conventional. The projector disclosed in JP 2007-121693 includes a fourth liquid crystal panel between an illumination optical system and a color separation and combination system, liquid crystal panels for red light, green light, and blue light for the image formation, and the like. The relay optical system provides an imaging relationship between the fourth liquid crystal panel and the liquid crystal panels for red light, green light, and blue light.

JP 2014-067031 discloses a relay optical system that reimages an image display surface of a second DMD on an image display surface of a first DMD. This relay optical system includes an Offner optical system that includes mirrors having positive, negative, and positive powers, and an optical element having a free-form surface for an aberration correction.

JP 2007-121693 discloses a relay optical system that reimages light from the fourth liquid crystal panel on each of liquid crystal panels for red light, green light, and blue light by a lens system, but in order to ensure a predetermined performance in the relay optical system, it is necessary to make longer an overall length and the apparatus becomes larger. Further, since it is necessary to combine a plurality of expensive glasses in order to improve the chromatic aberration, the cost increases.

The relay optical system disclosed in JP 2014-067031 requires an expensive element having a free-form surface, and the first DMD and the second DMD arranged in parallel (to make parallel optical axes of an illumination optical system and a projection optical system to each other). As a result, the relay optical system becomes larger in order to avoid interference between the relay optical system and the illumination system.

SUMMARY OF THE INVENTION

The present invention provides an optical apparatus using a relay optical system, which is smaller and less expensive than conventional.

An optical apparatus according to one aspect of the present invention includes a light source unit, at least one first light modulation element, an illumination optical system configured to illuminate the first light modulation element using light from the light source unit, and a relay optical system configured to make conjugate with each other a predetermined surface on an optical path between the light source unit and the first light modulation element, and a surface of the first light modulation element. The relay optical system includes, in order from the predetermined surface to the first light modulation element, a first reflection surface having a positive power, a second reflection surface having a negative power, and a third reflection surface having a positive power. The relay optical system satisfies the following conditional expression:

$$1.05 \leq R2*(1/R1+1/R3) \leq 9.00; \text{ or}$$

$$0.10 \leq R2*(1/R1+1/R3) \leq 0.95,$$

where R1 is a curvature radius of the first reflection surface, R2 is a curvature radius of the second reflection surface, and R3 is a curvature radius of the third reflection surface.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
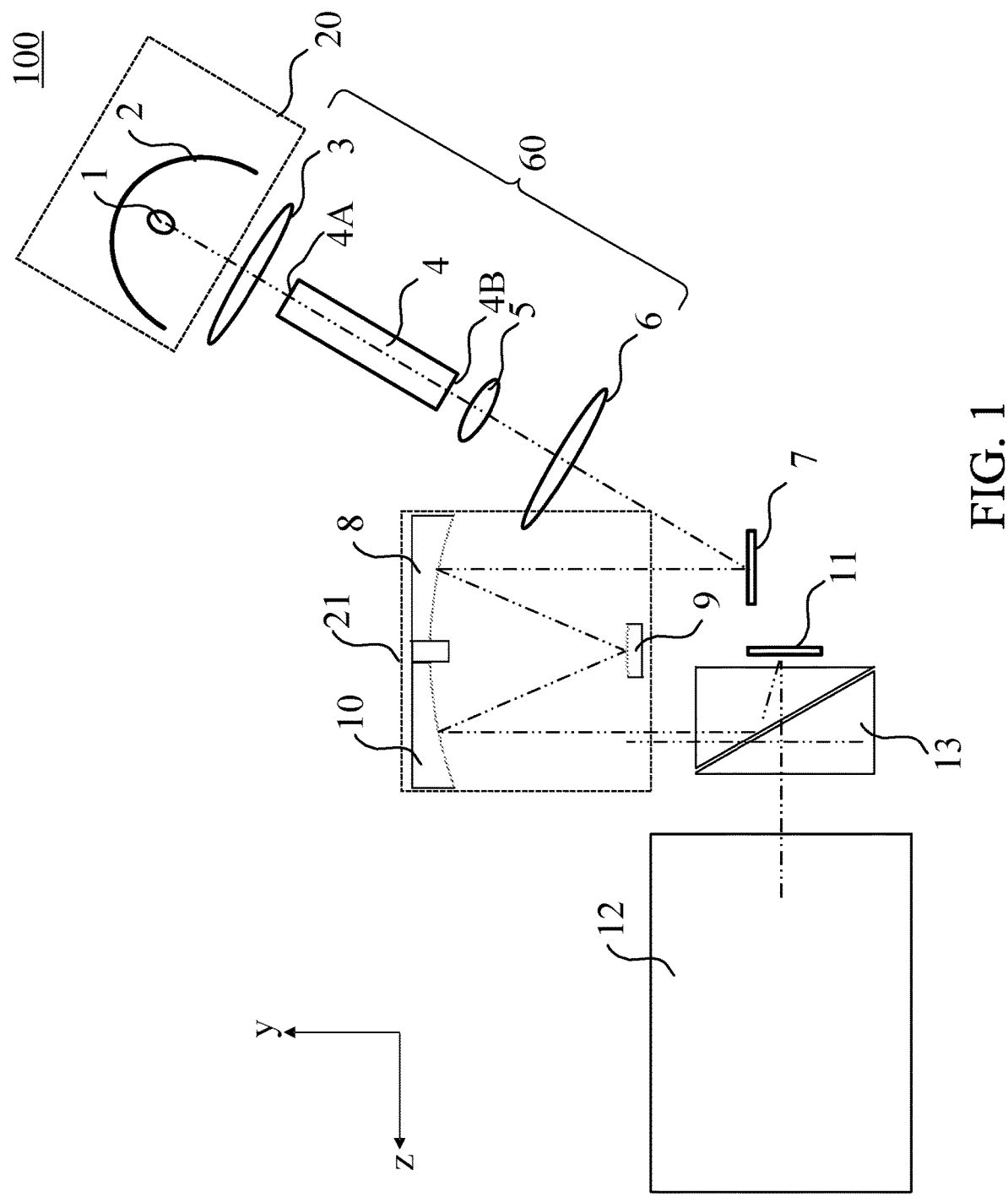
FIG. 1 illustrates a configuration of an image projection apparatus according to a first embodiment.

Referring now to FIG. 1, a description will be given of a configuration of a projector (image projection apparatus, optical apparatus) according to a first embodiment of the present invention. FIG. 1 illustrates a configuration of the image projection apparatus 100.

A light source unit 20 is a high-pressure mercury lamp having a light emitting tube 1 and a parabolic reflector 2. A plurality of light beams emitted from the light emitting tube 1 in various directions are collimated by the parabolic reflector 2 and travel toward an illumination optical system 60. A solid state light source unit may be used for the light source unit 20 instead of the high-pressure mercury lamp. The solid state light source unit is a light source unit having a blue laser diode (blue LD) that emits blue light and a yellow phosphor that converts part of the blue light from the blue LD into yellow light. Alternatively, the solid state light source unit is a light source unit which has a solid state light source like the light source unit provided with blue LD, red LD, and green LD. In other words, the light source unit 20 may be either the high-pressure mercury lamp or the solid-state light source unit as long as it emits illumination light including first colored light, second colored light, and third colored light having different wavelengths.

The light from the light source unit 20 is condensed on an incident surface 4A of a rod integrator 4 by a collective lens (condenser lens) 3. The light incident on the rod integrator 4 is repeatedly reflected inside and guided to an exit surface 4B. The repetitive light reflections inside the rod integrator 4 makes substantially uniform a light amount distribution on the exit surface 4B. The light from the emission surface 4B illuminates a second DMD (digital micro mirror device, second light modulation element) 7 that is a luminance modulation panel via a first lens 5 and a second lens 6 that have a substantially conjugate relationship with the second DMD 7. In this embodiment, the illumination optical system 60 includes the collective lens 3, the rod integrator 4, the first lens 5, and the second lens 6.

The second DMD 7 is disposed near (a position of) the predetermined surface on the optical path between the light source unit 20 and a first DMD 11. The second DMD 7 is an image display element in which a plurality of pixels constituting an image include micro mirrors, and the micro mirrors are spread over one surface to form an image display area as one plane. In the second DMD 7, the plurality of micro mirrors are switched to two inclination positions of the ON state and the OFF state corresponding to the image information. The second DMD 7 modulates the light by switching the light beam angle between the incident light and the reflected light. A transmission type liquid crystal panel or a reflection type liquid crystal panel may be used instead of the second DMD 7 which is a luminance modulation panel. Alternatively, a diffractive-optical element that changes a diffraction pattern with time may be used.

The light illuminated on the second DMD 7 undergoes a luminance modulation based on an input signal to the second DMD 7. The light having a modulated luminance enters a relay optical system 21. The relay optical system 21 includes a first mirror (first reflection surface) 8 having a positive power, a second mirror (second reflection surface) 9 having a negative power, and a third mirror (third reflection surface) 10 having a positive power. The light incident on the relay optical system 21 is totally reflected by a TIR prism (internal total reflection prism) 13 through the first mirror 8, the second mirror 9, and the third mirror 10, and illuminates the first DMD (the first light modulation element) 11. The first DMD 11 is an image display panel (image display element) in which a plurality of pixels for constituting an image include micro mirrors, and the micro mirrors are spread over one surface to form an image display area as one plane.

The TIR prism 13 is a color separator configured to separate light according to the wavelength on the optical path between the third mirror 10 and the first DMD 11, and is an optical element having two prisms having an air gap. The relay optical system 21 is disposed to make substantially conjugate with each other the second DMD 7 (a predetermined surface on the optical path between the light source unit 20 and the first DMD 11) and (a surface of) the first DMD 11 (or so that the predetermined image of the illumination optical system 60 and the first DMD 11 have a substantially conjugate relationship). The light modulated by the first DMD 11 transmits the TIR prism 13 and is projected onto an unillustrated screen (projection surface) via a projection lens 12. The projection lens 12 is a projection optical system that projects light from the first DMD 11 onto the projection surface.

This embodiment separates, through the TIR prism 13, the incident light to the first DMD 11 and the exit light from the first DMD 11, but the present invention is not limited to this embodiment. For example, the back focus of the projection lens 12 may be made sufficiently long and the projection lens 12 may be disposed at a position where the light beams are completely separated. FIG. 1 shows only one first DMD 11, but two or more DMDs may be used. Although not described in this embodiment, when the number of image display panels is two or less, it is necessary to display RGB as at least three primary colors in a time division manner using a color wheel and an intermittent turning on the LD. This embodiment configures the first mirror 8 and the third mirror 10 as separate components, but the first mirror 8 and the third mirror 10 may be integrated with each other. This is particularly useful when the first mirror 8 and the third mirror 10 have the same curvature radius.

When the object plane of the relay optical system 21 is set to the second DMD 7 and the image plane is set to the first DMD 11, it is necessary to introduce light onto the first DMD 11 at a predetermined angle. Thus, in order to obtain a predetermined resolution in the image display area of the first DMD 11, it is necessary to tilt the image plane or the first DMD 11. In order to tilt the image plane, it is necessary to generate a curvature of field in the relay optical system 21 and the Petzval sum of the relay optical system 21 needs to have a predetermined value that is not zero.

The Petzval sum P of the relay optical system 21 is defined by the following expression (1).

$$P = 1/f1 + 1/f2 + 1/f3 = 2/R1 - 2/R2 + 2/R3 = 2/R2*(R2(1/R1 + 1/R3) - 1) \quad (1)$$

In the expression (1), $f1$ (>0) is the focal length of the first mirror 8, $f2$ (<0) is the focal length of the second mirror 9, and $f3$ (>0) is the focal length of the third mirror 10. $R1$ (>0) is the curvature radius of the first mirror 8, $R2$ (>0) is the curvature radius of the second mirror 9, and $R3$ (>0) is the curvature radius of the third mirror 10.

The relay optical system 21 according to this embodiment is configured to satisfy the following conditional expression (2) or (3).

$$1.05 \leq R2*(1/R1 + 1/R3) \leq 9.00 \quad (2)$$

$$0.10 \leq R2*(1/R1 + 1/R3) \leq 0.95 \quad (3)$$

When the value is lower than the lower limit in the conditional expression (2) or the value is higher than the upper limit in the conditional expression (3), the relay optical system 21 hardly generates the curvature of field and thus cannot provide a predetermined resolution because the image display area of the first DMD 11 becomes out of focus. In addition, if the value is higher than the upper limit in the conditional expression (2), the negative power becomes too weak to provide a proper aberration correction effect because the aberration is corrected by the positive, negative, and positive configuration. If the value is lower than the lower limit in the conditional expression (3), the negative power is so strong that the aberration correction becomes excessive and the aberration becomes worse.

The relay optical system 21 may satisfy the following conditional expression (4) or (5).

$$1.40 \leq R2*(1/R1 + 1/R3) \leq 9.00 \quad (4)$$

$$0.10 \leq R2*(1/R1 + 1/R3) \leq 0.80 \quad (5)$$

When R2 that meets the conditional expression (4) is set to R2A and R2 that meets the conditional expression (5) is set to R2B, R2A>R2B is satisfied. Since the Petzval sum P is inversely proportional to R2 from the expression (1), a range of the predetermined Petzval sum P is different between when the value is 1 or higher and when the value is 1 or lower.

The relay optical system 21 may satisfy the following conditional expression (6).

$$0.70 \leq R1/R3 \leq 1.3 \quad (6)$$

If the value is higher than the upper limit or lower than the lower limit in the conditional expression (6), the aberration, such as the spherical aberration, significantly occurs and the desired resolution performance cannot be obtained.

The relay optical system 21 may satisfy the following conditional expression (7).

$$0.80 \leq R1/R3 \leq 1.20 \quad (7)$$

The relay optical system 21 that satisfies the conditional expression (2) may satisfy the following conditional expressions (8a) and (8b).

$$1.04 \leq R1/Do \quad (8a)$$

$$1.04 \leq R3/Di \quad (8b)$$

In the conditional expressions (8a) and (8b), Do is an air conversion distance from the second DMD 7 (or the predetermined surface) to the first mirror 8, and Di is an air conversion distance from the third mirror 10 to the first DMD 11.

The relay optical system 21 that satisfies the conditional expression (2) may satisfy the following conditional expressions (9a) and (9b).

$$1.10 \leq R1/Do \quad (9a)$$

$$1.10 \leq R3/Di \quad (9b)$$

The relay optical system 21 that satisfies the conditional expression (3) may satisfy the following conditional expressions (10a) and (10b).

$$R1/Do \leq 0.96 \quad (10a)$$

$$R3/Di \leq 0.96 \quad (10b)$$

The relay optical system 21 that satisfies the conditional expression (3) may satisfy the following conditional expressions (11a) and (11b).

$$R1/Do \leq 0.90 \quad (11a)$$

$$R3/Di \leq 0.90 \quad (11b)$$

Figure 2:
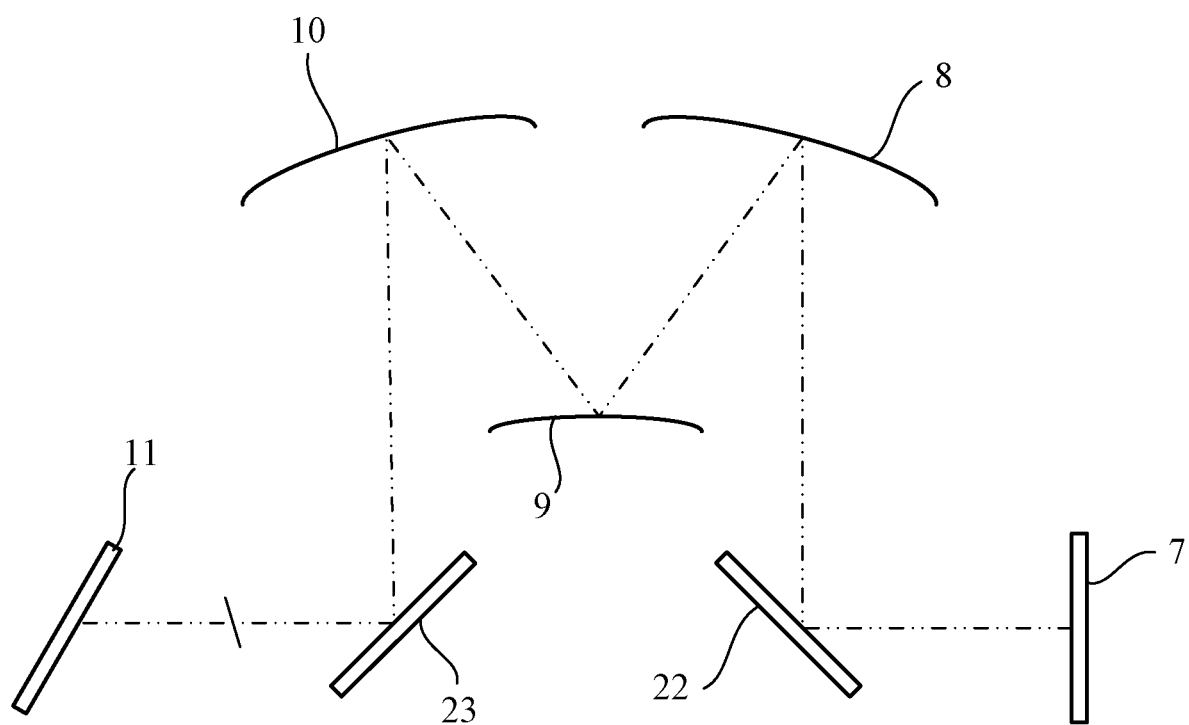
FIG. 2 illustrates a variation of the image projection apparatus according to the first embodiment.

FIG. 2 illustrates a variation of the image projection apparatus 100 according to this embodiment. As illustrated in FIG. 2, a turn-back mirror 22 may be provided on the optical path between the second DMD 7 and the first mirror 8, and a turn-back mirror 23 may be provided on the optical path between the third mirror 10 and the first DMD 11.

Figure 3:
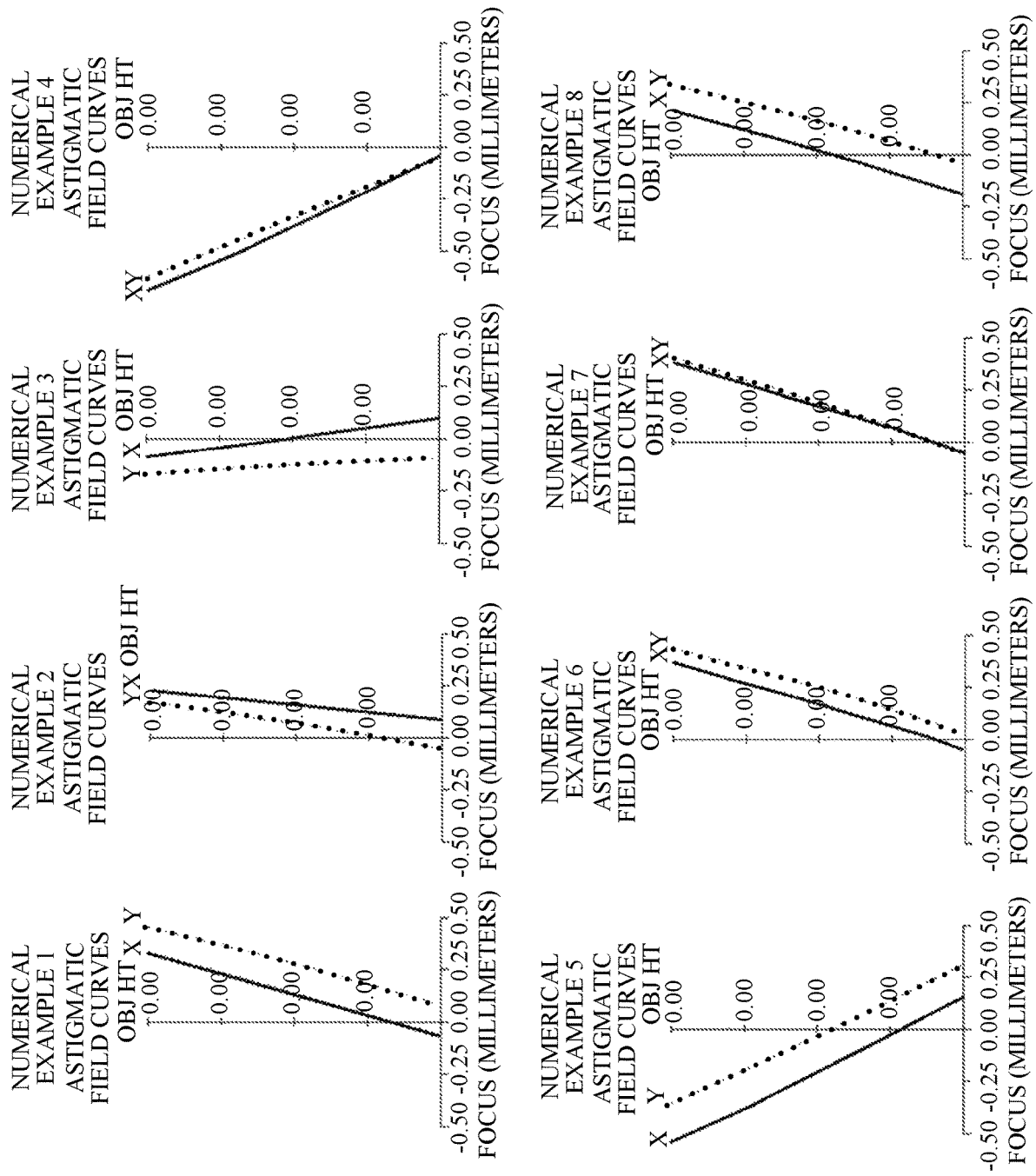
FIG. 3 is an aberration diagram of astigmatism in a relay optical system in each numerical example.

Hereinafter, numerical examples 1 to 8 of the relay optical system 21 will be shown. FIG. 3 is a longitudinal aberration diagram (aberration diagram of the astigmatism) of the relay optical system 21 in each numerical example. In FIG. 3, a solid line represents a meridional component, and a chain line represents a sagittal component.

Numerical Example 1

|        | R    | d    | nd  | Remarks       |
|--------|------|------|-----|---------------|
| Object | 0    | 62.0 | 1.0 | Second DMD    |
| 1      | 75.0 | 37.5 | 1.0 | First mirror  |
| 2      | 58.9 | 37.5 | 1.0 | Second mirror |
| 3      | 75.0 | 62.0 | 1.0 | Third mirror  |
| Image  | 0    | 0    | —   | First DMD     |

$R2*(1/R1+1/R3)=1.570$ $R1/R3=1.00$ $R1/Do=1.210$ $R3/Di=1.210$ (Conditional expression)

Numerical Example 2

|        | R    | d    | nd  | Remarks       |
|--------|------|------|-----|---------------|
| Object | 0    | 62.0 | 1.0 | Second DMD    |
| 1      | 65.0 | 32.5 | 1.0 | First mirror  |
| 2      | 36.1 | 32.5 | 1.0 | Second mirror |
| 3      | 65.0 | 62.0 | 1.0 | Third mirror  |
| Image  | 0    | 0    | —   | First DMD     |

$R2*(1/R1+1/R3)=1.120$ $R1/R3=1.00$ $R1/Do=1.048$ $R3/Di=1.048$ (Conditional expression)

Numerical Example 3

|        | R    | d    | nd  | Remarks       |
|--------|------|------|-----|---------------|
| Object | 0    | 62.0 | 1.0 | Second DMD    |
| 1      | 59.0 | 29.5 | 1.0 | First mirror  |
| 2      | 26.6 | 29.5 | 1.0 | Second mirror |
| 3      | 59.0 | 62.0 | 1.0 | Third mirror  |
| Image  | 0    | 0    | —   | First DMD     |

$R2*(1/R1+1/R3)=0.901$ $R1/R3=1.00$ $R1/Do=0.952$ $R3/Di=0.952$ (Conditional expression)

Numerical Example 4

|        | R    | d    | nd  | Remarks       |
|--------|------|------|-----|---------------|
| Object | 0    | 62.0 | 1.0 | Second DMD    |
| 1      | 54.0 | 27.0 | 1.0 | First mirror  |
| 2      | 20.2 | 27.0 | 1.0 | Second mirror |
| 3      | 54.0 | 62.0 | 1.0 | Third mirror  |
| Image  | 0    | 0    | —   | First DMD     |

$R2*(1/R1+1/R3)=0.749$ $R1/R3=1.00$ $R1/Do=0.871$ $R3/Di=0.871$ (Conditional expression)

Numerical Example 5

| | R | d | nd | Remarks |
|---|---|---|---|---|
| Object | 0 | 63.0 | 1.0 | Second DMD |
| 1 | 52.0 | 26.0 | 1.0 | First mirror |
| 2 | 20.4 | 26.0 | 1.0 | Second mirror |
| 3 | 53.4 | 56.4 | 1.0 | Third mirror |
| Image | 0 | 0 | — | First DMD |

$R2*(1/R1+1/R3)=0.776$ $R1/R3=0.973$ $R1/Do=0.825$ $R3/Di=0.947$ (Conditional expression)

Numerical Example 6

| | R | d | nd | Remarks |
|---|---|---|---|---|
| Object | 0 | 62.0 | 1.0 | Second DMD |
| 1 | 80.0 | 40.0 | 1.0 | First mirror |
| 2 | 72.1 | 40.0 | 1.0 | Second mirror |
| 3 | 74.8 | 57.9 | 1.0 | Third mirror |
| Image | 0 | 0 | — | First DMD |

$R2*(1/R1+1/R3)=1.865$ $R1/R3=1.070$ $R1/Do=1.290$ $R3/Di=1.292$ (Conditional expression)

Numerical Example 7

| | R | d | nd | Remarks |
|---|---|---|---|---|
| Object | 0 | 62.0 | 1.0 | Second DMD |
| 1 | 74.0 | 37.4 | 1.0 | First mirror |
| 2 | 61.3 | 37.4 | 1.0 | Second mirror |
| 3 | 70.1 | 53.6 | 1.0 | Third mirror |
| Image | 0 | 0 | — | First DMD |

$R2*(1/R1+1/R3)=1.704$ $R1/R3=1.056$ $R1/Do=1.194$ $R3/Di=1.307$ (Conditional expression)

Numerical Example 8

| | R | d | nd | Remarks |
|---|---|---|---|---|
| Object | 0 | 62.0 | 1.0 | Second DMD |
| 1 | 75.0 | 37.5 | 1.0 | First mirror |
| 2 | 58.9 | 7.5 | 1.0 | Second mirror |
| 3 | 75.0 | 47.0 | 1.0 | Third mirror |
| 4 | 0 | 20.0 | 1.516 | TIR prism |
| 5 | 0 | 1.7 | 1.0 | Air |
| Image | 0 | 0 | — | First DMD |

$R2*(1/R1+1/R3)=1.570$ $R1/R3=1.000$ $R1/Do=1.210$ $R3/Di=1.212$ (Conditional expression)

Second Embodiment

Figure 4A:
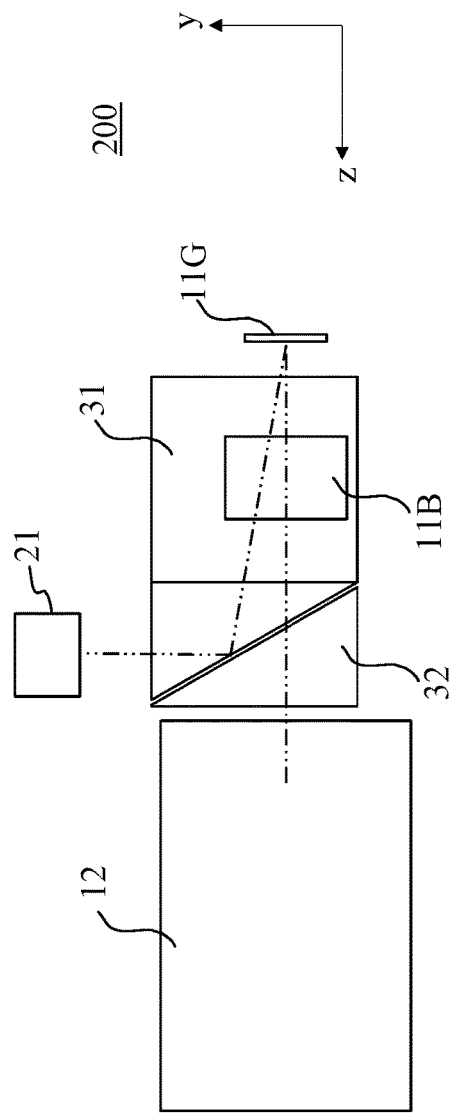
FIGS. 4A and 4B illustrate a configuration of an image projection apparatus according to a second embodiment.
Figure 4B:
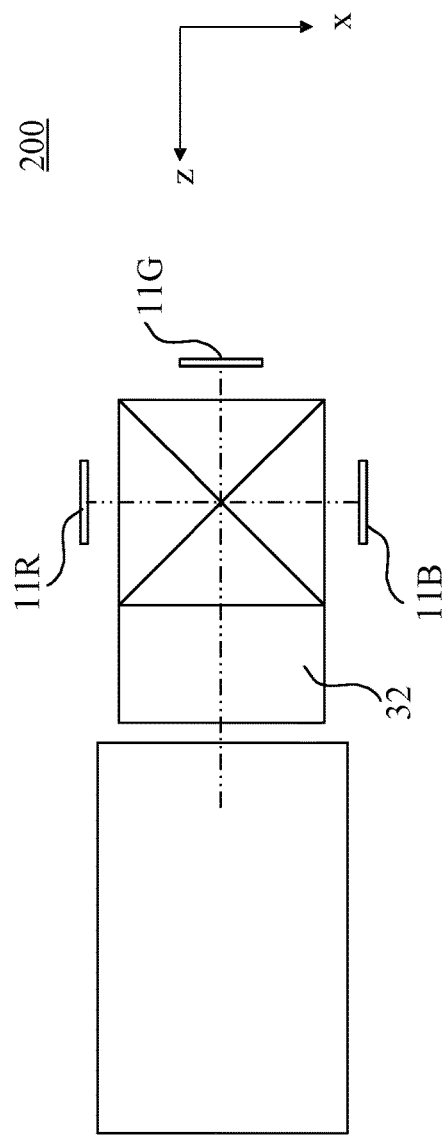

Referring now to FIGS. 4A and 4B, a description will be given of an image projection apparatus (optical apparatus) according to a second embodiment of the present invention. FIGS. 4A and 4B illustrate a configuration of the image projection apparatus 200 according to this embodiment. The image projection apparatus 200 includes three first DMDs (first light modulation elements) 11R, 11G, and 11B corresponding to red (R), green (G), and blue (B) colors.

In FIGS. 4A and 4B, reference numeral 31 denotes a TIR prism, and reference numeral 32 denotes a cross dichroic prism. The light from the relay optical system 21 is totally reflected by the TIR prism 31 and separated into red light, green light, and blue light by the cross dichroic prism 32. The red light is guided to the first DMD 11R, the green light is guided to the first DMD 11G, and the blue light is guided to the first DMD 11B, and modulated based on the image signal. The modulated light is combined by the cross dichroic prism 32 and projected onto an unillustrated screen via the projection lens 12.

Third Embodiment

Figure 5:
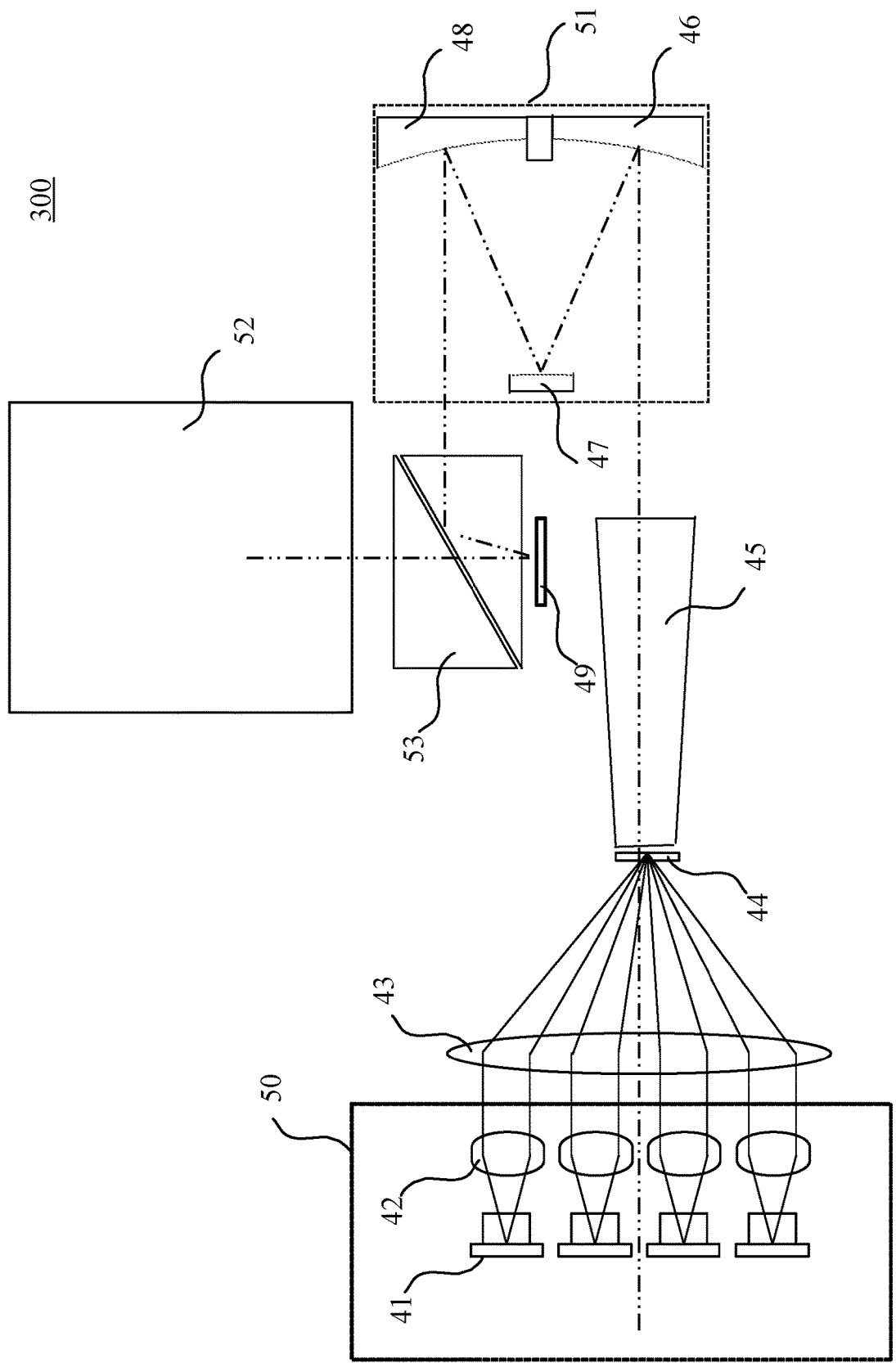
FIG. 5 illustrates a configuration of an image projection apparatus according to a third embodiment.

Referring now to FIG. 5, a description will be given of an image projection apparatus (optical apparatus) according to a third embodiment of the present invention. FIG. 5 illustrates a configuration of an image projection apparatus 300 according to this embodiment.

A light source apparatus (light source unit) 50 includes a plurality of light sources 41 and a plurality of collimator lenses 42. Each of the plurality of light sources 41 is a solid state light source (excitation light source), which is a laser diode (LD) in this embodiment. The first colored light emitted from the plurality of light sources 41 is collimated by the plurality of collimator lenses 42 and condensed on a phosphor 44 by a collective lens (condenser lens) 43. The second colored light emitted from the phosphor 44 and the first colored light unabsorbed by the phosphor 44 enter a rod integrator (rod integrator optical system) 45.

A relay optical system 51 includes a first mirror 46 having a positive power, a second mirror 47 having a negative power, and a third mirror 48 having a positive power. The light emitted from the rod integrator 45 is totally reflected by the TIR prism 53 via the first mirror 46, the second mirror 47, and the third mirror 48 of the relay optical system 51, and illuminates a DMD (first light modulation element) 49 as the image display panel. The light modulated by the DMD 49 transmits the TIR prism 53 and is projected onto the unillustrated screen via a projection lens 52.

While this embodiment shows only one DMD 49, two or more DMDs may be used. When two or less DMDs are used, a display unit is necessary which displays each color of at least three primary colors of R, G, and B in a time division manner using the color wheel and the intermittent turning of the LD. This embodiment separates the phosphor 44 from the rod integrator 45, but the present invention is not limited to this embodiment and the phosphor 44 may be applied to the incident surface of the rod integrator 45. Instead of the rod integrator 45, this embodiment may use a condenser lens including the first fly-eye lens and the second fly-eye lens.

Each embodiment can provide an optical apparatus that is smaller and less expensive than conventional using a relay optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment has described the image projection apparatus as the optical apparatus, but the present invention is not limited to this embodiment and each embodiment is applicable to an optical apparatus other than the image projection apparatus such as an exposure apparatus. Moreover, each embodiment separates the first mirror and the second mirror from each other, but the present invention is not limited to this embodiment and may integrate the first mirror and the second mirror with each other.

This application claims the benefit of Japanese Patent Application No. 2018-184263, filed on Sep. 28, 2018, which is hereby incorporated by reference herein in its entirety.

What is claimed is:

1. An optical apparatus comprising:
   a light source unit;
   at least one first light modulation element;
   an illumination optical system configured to illuminate the first light modulation element using light from the light source unit; and
   a relay optical system configured to make conjugate with each other a predetermined surface on an optical path between the light source unit and the first light modulation element, and a surface of the first light modulation element,
   wherein the relay optical system includes, in order from the predetermined surface to the first light modulation element, a first reflection surface having a positive power, a second reflection surface having a negative power, and a third reflection surface having a positive power,
   wherein the relay optical system satisfies the following conditional expression:

$1.05 \leq R2*(1/R1+1/R3) \leq 9.00$; or $0.10 \leq R2*(1/R1+1/R3) \leq 0.95$, where R1 is a curvature radius of the first reflection surface, R2 is a curvature radius of the second reflection surface, and R3 is a curvature radius of the third reflection surface.

2. The optical apparatus according to claim 1, wherein the relay optical system satisfies the following conditional expression:

$0.70 \leq R1/R3 \leq 1.30$.

3. The optical apparatus according to claim 1, wherein the relay optical system satisfies the following conditional expressions:

$1.04 \leq R1/Do$ and $1.04 \leq R3/Di$; or $R1/Do \leq 0.96$ and $R3/Di \leq 0.96$, where Do is an air conversion distance from the predetermined surface to the first reflection surface, and Di is an air conversion distance from the third reflection surface to the first light modulation element.

4. The optical apparatus according to claim 1, wherein the first light modulation element is an image display element in which a plurality of pixels include micro mirrors.

5. The optical apparatus according to claim 1, further comprising a color separator configured to separate light according to a wavelength on an optical path between the third reflection surface and the first light modulation element.

6. The optical apparatus according to claim 5, wherein the color separator includes a TIR prism.

7. The optical apparatus according to claim 1, further comprising a second light modulation element disposed near the predetermined surface.

8. The optical apparatus according to claim 7, wherein the second light modulation element includes an image display element in which a plurality of pixels include micro mirrors.

9. The optical apparatus according to claim 1, wherein the predetermined surface is an internal surface of the illumination optical system.

10. The optical apparatus according to claim 1, wherein the first reflection surface includes a reflection surface of a first mirror, a second reflection surface includes a reflection surface of a second mirror, and the third reflection surface includes a reflection surface of a third mirror.

11. The optical apparatus according to claim 10, wherein the first mirror and the second mirror are integrated with each other.

12. The optical apparatus according to claim 1, further comprising a projection optical system configured to project light from the first light modulation element onto a projection surface.

13. The optical apparatus according to claim 1, wherein the optical apparatus is an image projection apparatus.

\* \* \* \* \*